Figure 1:
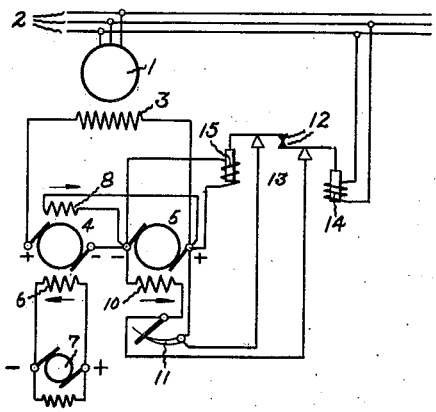

March 9, 1926.  1,576,100

R. DIETZE

REGULATING SYSTEM

Filed May 12, 1923

Inventor:
Richard Dietze,
by
His Attorney.

Patented Mar. 9, 1926.

1,576,100

UNITED STATES PATENT OFFICE.

RICHARD DIETZE, OF PANKOW, GERMANY, ASSIGNOR TO GENERAL ELECTRIC COMPANY, A CORPORATION OF NEW YORK.

REGULATING SYSTEM.

Application filed May 12, 1923. Serial No. 638,485.

*To all whom it may concern:*

Be it known that I, RICHARD DIETZE, a citizen of the German Realm, residing at Pankow, Germany, have invented certain new and useful Improvements in Regulating Systems, of which the following is a specification.

My invention relates to regulating systems and particularly to such systems which include a dynamo-electric machine adapted to control the condition to be regulated and a vibratory regulator of the well known Tirrill type for controlling the excitation of the machine. This type of regulator is disclosed in Patent 726,234, granted April 21, 1903, to A. A. Tirrill.

The range of regulation of Tirrill regulators is limited by the range over which the anti-hunting magnet, which is energized by the exciter voltage, can be made to operate satisfactorily. In Patent 1,109,236, granted Sept. 1, 1914, to H. A. Laycock and assigned to the same assignee as this application, there is described an arrangement whereby the range of regulation of a Tirrill regulator may be increased. In that patent the excitation of the dynamo-electric machine is supplied by two sources of current which are connected in opposition to each other. The voltage of one of the sources is constant and the voltage of the other source is automatically controlled by the Tirrill regulator in accordance with the condition being regulated, the anti-hunting magnet being energized by the variable voltage source. Preferably the variable voltage source is designed to have a higher voltage than the constant voltage source. The result secured by this arrangement is that while the voltage impressed upon the field winding of the main machine is the difference between the voltages of the two sources, the voltage impressed upon the anti-hunting winding is the voltage of the variable source. For example, assume that the voltage of the constant source is 60 volts, and the minimum voltage of the variable voltage source is 60 volts. Then if the regulator has a range of 1 to 3, the maximum voltage of the variable voltage source is 180 volts so that any voltage between 0 and 120 volts can be impressed upon the field winding of the machine.

Since, in the arrangement disclosed in the Laycock Patent 1,109,236, the voltage impressed upon the field winding of the dynamo-electric machine is the difference between the voltages of the variable voltage source and the constant voltage source, which are connected in the field circuit, it will be observed that the variable voltage source has to generate more power than is necessary to excite the dynamo-electric machine. In the example given above, the variable voltage exciter has to be designed to produce 50% more power than the amount supplied to the field winding when the machine is receiving its maximum excitation.

One object of my invention is to provide an improvement of the arrangement disclosed in the Laycock Patent 1,109,236 whereby the disadvantage mentioned above may be overcome. In accordance with my invention I provide in the field circuit of the dynamo-electric machine two sources having voltages which vary inversely with respect to each other as the load supplied thereby changes.

My invention will be better understood from the following description taken in connection with the accompanying drawing and its scope will be pointed out in the appended claims.

Figure 2:
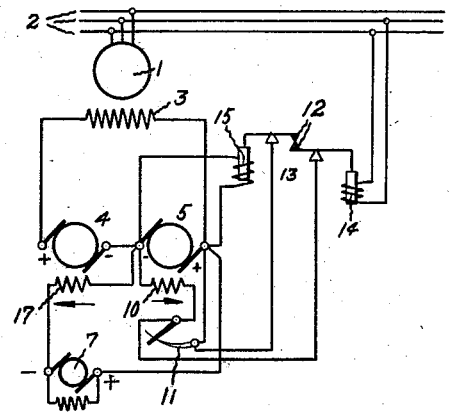

In the accompanying drawing Fig. 1 is a diagram of a voltage regulating system for an alternating current system embodying my invention and Fig. 2 is a modification of the system shown in Fig. 1.

Referring to Fig. 1, 1 is an alternating current generator which supplies current to an alternating current circuit 2 the voltage of which is to be regulated. The generator is provided with a field winding 3 which receives current from the exciters 4 and 5. The exciters are connected in series, the exciter 5 being of a higher voltage than the exciter 4. The exciter 4 is provided with a field winding 6, which is excited from a source of constant voltage 7 and a second field winding 8 which is excited by the exciter 5. The exciter 5 is provided with a shunt field winding 10 which has connected in series therewith a resistance 11. This resistance is arranged to be short circuited by the contacts 12 of a vibratory regulator 13 of the type disclosed in the above mentioned Tirrill patent so as to vary the voltage of the exciter 5. This regulator comprises a control coil 14, which, in the particular arrangement shown, is connected across one phase of the alternating current system 2 so that the coil is responsive to the voltage of the system, and an anti-hunting coil 15 connected across the terminals of the exciter 5.

The windings 6 and 8 are so connected that they produce opposing magnetic fields, the field produced by the winding 6 being in such a direction as to cause the exciter to generate a voltage which opposes the voltage of the exciter 5.

It will be apparent that when the load on the generator 1 is small the regulator 13 operates to maintain the voltage of the exciter 5 at a low value. Therefore the voltage of the exciter 4 is high at this time as the current in the differential field winding 8 is small. As the load increases and the vibratory regulator 13 increases the voltage of the exciter 5, the current through the differential field winding 8 of the exciter 4 increases so that the voltage of the exciter 4, which opposes the voltage of the exciter 5 decreases. Preferably the differential windings 6 and 8 are so designed that when the generator is supplying full load the voltage of the exciter 4 is zero and substantially all of the power being produced by the exciter 5 is supplied to the field winding 3 of the generator.

The advantage of my invention over the arrangement disclosed in the Laycock patent will be apparent from the following example. Let it be assumed that the range of the regulator is 1 to 3 and that it varies the voltage of the exciter 5 from 40 volts at no load to 120 volts at full load. Let it also be assumed that the constant excitation of the field winding 6 is such that it alone would cause a voltage of 60 volts to be generated and that the winding 8 is so designed that it alone would produce a voltage of 20 volts when a voltage of 40 is impressed thereon. Therefore it will be apparent that when the regulator is working at the lowest point of its range, namely, when it is holding the voltage of the exciter 5 at 40 volts, the exciter 4 will also produce a voltage of 60—20 or 40 volts so that the voltage impressed across the field winding 3 is zero. When the regulator 13 is working at the highest point of its range, namely, when it is holding the voltage of the exciter 5 at 120 volts, then the exciter 4 will generate a voltage of 60—60 or 0 volts so that the voltage impressed across the field winding 3 is 120 volts, the voltage of the exciter 5. From the above description it is apparent that by means of my invention a much smaller exciter 5 is required for a given voltage range than in the arrangement shown in the Laycock patent.

In the modification shown in Fig. 2, the exciter 4 is provided with only one field winding 17 which is connected in series with the exciter 5 and the constant voltage source 7 which are connected in opposition to each other. Preferably the voltage of the constant voltage source 7 is made equal to the maximum voltage of the exciter 5 so that the two voltages are equal and the current through the field winding 17 is zero when the machine 1 is carrying full load.

The operation of the modification is obvious from the description given above in connection with Fig. 1 so that further description is deemed unnecessary.

While I have shown and described my invention in connection with a voltage regulating system it will be apparent to those skilled in the art that my invention is not limited thereto but may be embodied in any regulating system employing a vibratory regulator of the Tirrill type. Therefore, I do not desire to be limited to the exact arrangements shown and described but seek to cover in the appended claims all those embodiments and modifications thereof that fall within the true spirit and scope of my invention.

What I claim as new and desire to secure by Letters Patent of the United States, is,—

1. In a regulating system, a dynamo-electric machine adapted to control the condition to be regulated, two sources of current connected in opposition to each other in the field circuit of the machine, means responsive to the condition to be regulated for regulating the voltage of one of said sources of current, and regulating means whereby the voltage of the other one of said sources varies inversely with respect to the voltage of said one of said sources.

2. In a regulating system, a dynamo-electric machine adapted to control the condition to be regulated, means for exciting the field of said dynamo-electric machine comprising two sources of current connected in opposition to each other, a vibratory regulator for controlling the voltage of one of said sources having a coil responsive to the voltage of said one of said sources and another coil connected and arranged so as to be energized in accordance with the condition to be regulated, and regulating means whereby the voltage of the other source varies inversely with respect to the voltage of said one of said sources.

3. In a regulating system, a dynamo-electric machine adapted to control the condition to be regulated, means for exciting the field of said dynamo-electric machine comprising two sources of current connected in opposition to each other in the field circuit of said machine, a vibratory regulator for controlling the voltage of one of said sources having a coil responsive to the voltage of said one of said sources and another coil connected and arranged so as to be energized in accordance with the condition to be regulated, and a field winding for the other source connected to said one of said sources and arranged to be energized in such a manner that the voltages of said sources vary inversely with respect to each other.

4. In a voltage regulating system for a dynamo-electric machine, two exciters connected in opposition to each other in the field circuit of the dynamo-electric machine, a vibratory regulator for controlling the voltage of one of said exciters having a coil connected so that it is energized in accordance with the exciter voltage which the regulator controls, and another coil connected and arranged so as to be energized in accordance with the voltage of said dynamo-electric machine, and a field winding for the other exciter connected to said one of said exciters in such a manner that the voltages of said sources vary inversely with respect to each other.

5. In a regulating system, a dynamo-electric machine adapted to control the condition to be regulated, two exciters connected in opposition to each other in the field circuit of said dynamo-electric machine, means for controlling the voltage of one of said exciters in accordance with the condition to be regulated, a source of constant voltage, and means for exciting the other one of said exciters in accordance with the difference between the voltage of said constant voltage source and the voltage of said one of said exciters.

6. In a regulating system, a dynamo-electric machine adapted to control the condition to be regulated, two exciters connected in opposition to each other in the field circuit of said dynamo-electric machine, means for controlling the voltage of one of said exciters in accordance with the condition to be regulated, a source of constant voltage, a field winding for the other one of said exciters energized by said one of said exciters, and a second field winding for the other one of said exciters energized by said constant voltage source, said field windings being so connected and arranged that they produce opposing magnetomotive forces.

In witness whereof, I have hereunto set my hand this 28th day of April, 1923.

RICHARD DIETZE.